United States Patent
Dytmire et al.

(10) Patent No.: US 10,742,524 B2
(45) Date of Patent: Aug. 11, 2020

(54) FRAMEWORK FOR STANDARDIZING DEVELOPMENT AND DEPLOYMENT OF SERVICES

(71) Applicant: Monza Cloud, LLC, Atlanta, GA (US)

(72) Inventors: Robert William Dytmire, Roswell, GA (US); Albert Edward Hunkin, Jr., Roswell, GA (US)

(73) Assignee: MONZA CLOUD, LLC, Roswell, GA (US)

( * ) Notice: Subject to any disclaimer, the term of this patent is extended or adjusted under 35 U.S.C. 154(b) by 353 days.

(21) Appl. No.: 15/868,165

(22) Filed: Jan. 11, 2018

(65) Prior Publication Data

US 2019/0215251 A1 Jul. 11, 2019

(51) Int. Cl.
*H04L 12/24* (2006.01)
*H04L 29/08* (2006.01)
(Continued)

(52) U.S. Cl.
CPC .......... *H04L 41/5041* (2013.01); *G06F 9/547* (2013.01); *G06F 21/602* (2013.01);
(Continued)

(58) Field of Classification Search
CPC ............... G05B 17/02; G05B 19/0423; G05B 2219/13174; G06F 30/20; G06F 21/602; G06F 9/4856; G06F 9/547; G06F 21/629; G06F 9/5055; G06F 9/5072; G06F 21/6218; G06F 19/00; G06F 1/28; G06F 21/6209; G06F 21/6281; G06F 21/645; G06F 2221/2107; G06F 2221/2141; G06G 7/66; H04L 67/10; H04L 41/5041; H04L 67/2842; H04L 41/5054; H04L 67/1097; H04L 45/306; H04L 45/74;
(Continued)

(56) References Cited

U.S. PATENT DOCUMENTS 6,965,928 B1* 11/2005 Cox ................... H04L 41/082
709/203
2014/0123292 A1* 5/2014 Schmidt ............... H04L 67/10
726/25

(Continued)

*Primary Examiner* — Abiy Getachew
(74) *Attorney, Agent, or Firm* — Meunier Carlin & Curfman LLC

(57) ABSTRACT

A framework that provides for development and deployment of services that future-proofs application development efforts, avoids vendor "lock-in" at the PaaS level, and offers true portability of applications and services. Using the framework, developers write application code to a common API interface that connects to resources. The API interface obtains configuration data from a configuration provider that provides configuration data. The configuration data points to an implementation of the code that is bound at runtime. This results in a separation of the API from the configuration data. Using the framework, the application code is portable and can be moved from one framework to another so long each of the frameworks adhere to the common API interface. As such, application code may be written once and then implemented on one or more cloud-based infrastructures and/or within an on-premises data center.

17 Claims, 16 Drawing Sheets

(51) Int. Cl.
*G06F 21/60* (2013.01)
*G06F 9/54* (2006.01)

(52) U.S. Cl.
CPC .......... *H04L 67/10* (2013.01); *H04L 67/1097* (2013.01); *H04L 67/2842* (2013.01)

(58) Field of Classification Search
CPC ............. H04L 63/0281; H04L 63/0414; H04L 63/0428; H04L 63/0471; H04L 63/0492; H04L 63/102; H04L 63/105; H04L 63/107; H04L 63/20; H04L 67/18; H04L 67/42; H04L 9/32; G16Z 99/00; H04W 4/029; Y02D 10/26; Y02D 10/28
See application file for complete search history.

(56) References Cited

U.S. PATENT DOCUMENTS

| | | | |
|---|---|---|---|
| 2015/0052218 A1* | 2/2015 | Zhang | H04L 67/10 709/217 |
| 2015/0074409 A1* | 3/2015 | Reid | H04L 63/061 713/171 |
| 2016/0110549 A1* | 4/2016 | Schmitt | G06F 21/577 726/25 |
| 2016/0150053 A1* | 5/2016 | Janczuk | H04L 67/1097 709/217 |
| 2016/0246592 A1* | 8/2016 | Jamjoom | G06F 8/70 |
| 2016/0321051 A1* | 11/2016 | Austel | H04L 67/025 |
| 2017/0322793 A1* | 11/2017 | Ran | G06F 9/45558 |
| 2018/0131583 A1* | 5/2018 | Barrows | H04L 67/306 |

\* cited by examiner

FRAMEWORK FOR STANDARDIZING DEVELOPMENT AND DEPLOYMENT OF SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Traditionally, application and services have been hosted by on-premises data centers. However, the traditional on-premises hosting paradigm is costly because customers incurred expenses to develop and maintain the hardware and software associated with the on-premises data centers. As such, there has been a trend toward moving applications and services to third-party providers (e.g., cloud services) that support computing models such as, Infrastructure as a Service (IaaS) and Platform as a Service (PaaS). These models service to reduce costs, as the customer no longer no longer needs to host and manage their own data center.

However, moving applications and services to third-party providers has several major risks. For example, the move must be done all at once as it is difficult to move portions of the business logic of the applications and services to third-party providers without impacting the whole system. There are also concerns about vendor "lock-in" as writing code to a third-party's API may make it difficult to move when the third-party provider raises prices. In addition, moving to a new third-party provider can be costly. For example, such moves often require help from highly paid consultants. There are training issues with third-party providers, as the customer's developers likely have deep knowledge of their own on-premises APIs, but do not have a full understanding of the target APIs of the third-party provider. The training issue is compounded if the customer decides to use multiple third-party providers, as the customer's developers will have to maintain knowledge of several APIs.

Further, PaaS is a relatively new technology and code written correctly against a particular API can break if that API changes or is depreciated. Scaling issues make it unfeasible to scale-up the large numbers of service offerings as they multiply. That is, the tracking of resources against applications becomes extremely complex, as an application may access dozens of resources, some of which may change or move during the application's lifespan. Configuration and environment identifiers are bound tightly to the deployed code, which causes severe problems as the number of modules of code increases. That is, the code no longer exists in just a few deployment modules. Finally, configuration management is still practiced as if it is old on-premises and has not evolved with the third-party provider hosting paradigm.

Thus, there is a need for an PaaS architecture that provides a solution to the limitations of conventional solutions.

SUMMARY

The present disclosure is directed to a framework that provides for rapid development and deployment of services within cloud-based and/or on-premises environment that also provides for abstraction and normalization of access to resources and configuration data. The configuration data may be stored in a central repository and resources within the framework are exposed using shortcut names. The framework provides automatic identification and self-discovery of the deployment environment and applications.

In accordance with the present disclosure, there is provided a method for service development and deployment in a Platform as a Service (PaaS) environment. The method may include executing a framework that receives, at a common API interface, requests from application code for predetermined functionalities provided by the service framework; uses an API manager to connect each of the requests to an associated resource in the PaaS environment; and uses an API configuration provider to retrieve configuration data from a linked configuration data source to provide the configuration information the API manager that generates an implementation class that handles communications to and from the resource and the application code. The service is executed in accordance with the application code using the framework in the PaaS environment.

In accordance with another aspect of the present disclosure, there is provided a method executing a service in a Platform as a Service (PaaS) environment that includes executing a framework having an API manager, common libraries, a configuration provider and a configuration data source, the framework further defining a common API interface; receiving a token from application code associated with the service at the API interface; acquiring, by the configuration provider, configuration data from a configuration data source; caching the configuration data executing the common libraries in accordance with the configuration information to invoke APIs that connect to resources requested by the application; and executing the service.

In accordance with yet another aspect of the present disclosure, a non-transitory computer readable medium includes computer-executable instructions that when executed by a computing device, cause the computing device to perform a method, comprising executing a framework that receives, at a common API interface, requests from application code for predetermined functionalities provided by the service framework; uses an API manager to connect each of the requests to an associated resource in the PaaS environment; and uses an API configuration provider to retrieve configuration data from a linked configuration data source to provide the configuration information the API manager that generates an implementation class that handles communications to and from the resource and the application code. The computer-executable instructions further executing a service in accordance with the application code using the framework in the PaaS environment.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The components in the drawings are not necessarily to scale relative to each other. Like reference numerals designate corresponding parts throughout the several views.

DETAILED DESCRIPTION

Overview

The present disclosure is directed to a framework that provides for flexible, rapid development and deployment of services. As will be described below, the framework provides a new paradigm for cloud development that future-proofs application development efforts, avoids vendor "lock-in" at the PaaS level, and offers true portability of applications and services. To facilitate movement of applications to cloud-based architectures, the present disclosure provides an environment where applications may be written in a manner such that services may be deployed in pieces. The enables portions of the application may reside on-premises while other portions may reside off-premises. For example, applications can be written such that existing on-premises resources are referenced. Later, applications can be moved to any third-party PaaS service by simply coding a few providers. Using the framework, developers only need to learn one API for all PaaS offerings, which reduces API training expenses and enables developers to move from one project to another using the same skill set With the framework, resources are tested to work in each environment before deployment, reversing the conventional configuration methodology. The number of modules does not increase complexity. Configuration is marshaled and exposed to the application code using shortcuts. These shortcuts may be tested and modified before deployment. As such, the framework reduces or eliminates the need for deployment files and a module that accesses a resource does not need or use complicated configuration merges and management.

A "smart cache" allows for runtime re-acquisition of data. In the event of a mis-configured setting, the smart cache allows for changes to be replicated to the effected running code without having to identify the effected code nor restarting effected modules. Changes are automatically transmitted to the smart cache using a single, application-wide, token.

Figure 1:
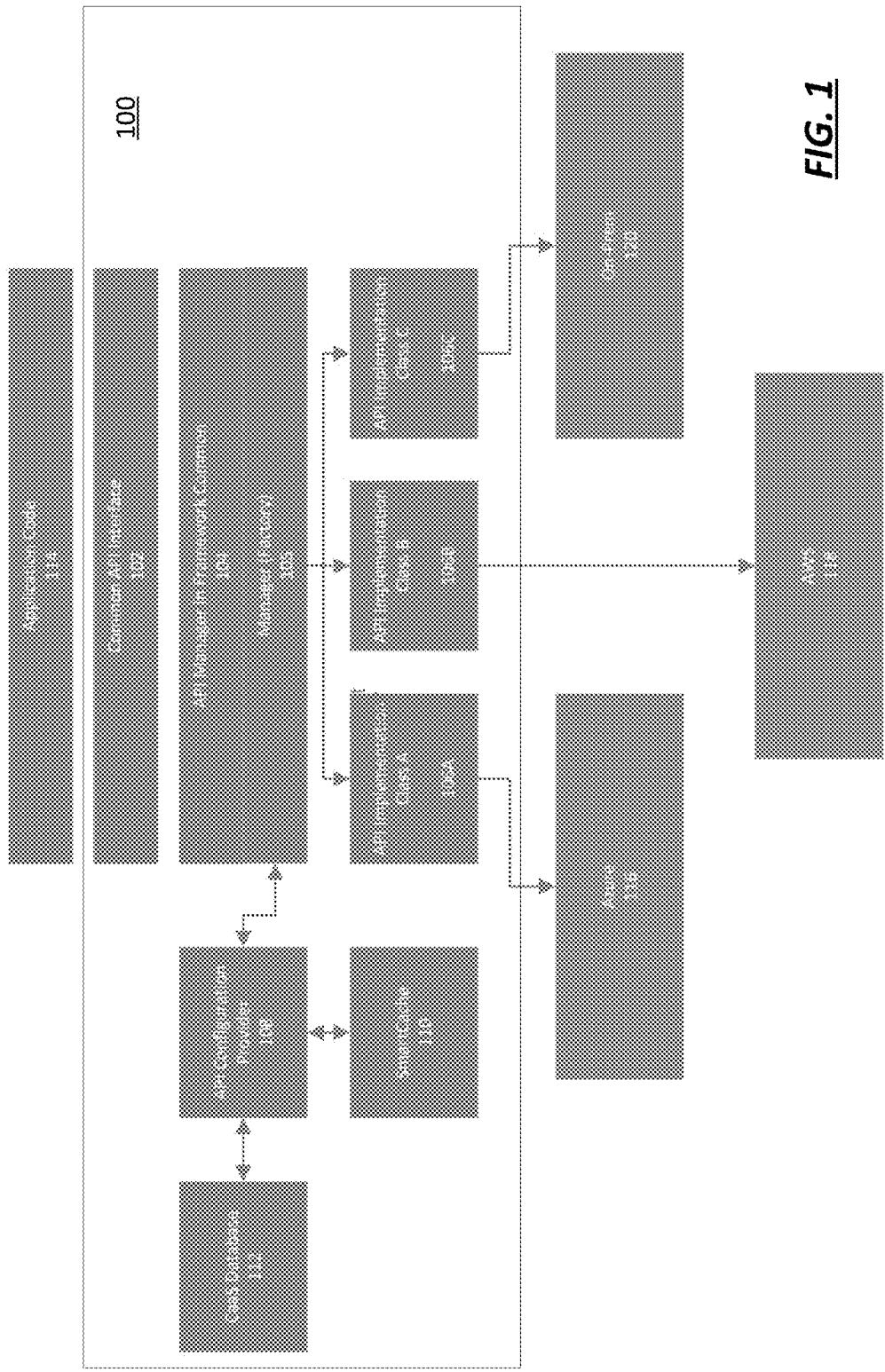
FIG. 1 illustrates an example framework in accordance with the present disclosure.

With the overview above, reference is made to FIG. 1, which illustrates an example framework 100 in accordance with the present disclosure. The framework 100 includes a common API interface 102, an API manager 104, a manager factory 105, one or more API implementation classes 106A-106C, an API configuration provider 108, a SmartCache 110, and a CaaS database 112. The framework 100 may interface with one or more third-party PaaS environments (e.g., Azure 116, Amazon Web Services (AWS) 118, or similar, such as Oracle, Google) or an on-premises datacenter 120.

Using the framework 100, developers may write application code 114 to the common API interface 102. The common API interface 102 may consist of C # interfaces (e.g., a type of contract between pieces of code), where each C # interface covers a different area of functionality. Each C # interface is, in almost all cases, generic and thus maybe used for any third-party PaaS environment. An exception may be when a PaaS vendor has an offering that is unique to their platform. When such a situation occurs, the C # interface may include vendor-specific references. Within the framework 100, the functions of the API manager 104 and the manager factory 105 fall within a master library of code that is used to connect resources in C # (herein "framework common"). Each resource type that is supported by the framework 100 has its own interface and the classes self-register the type of resource to which they will bind. To identify each resource type, a unique GUID is used, which is maintained within the CaaS database 112. Alternatively, identity columns (INTs) may be used to identify columns in the database 112.

The API interface 102 obtains configuration data from the configuration provider 108. The configuration provider 108 links a data source (e.g., the database 112) to the framework 100 and provides configuration data from that source. The configuration data points to an implementation of the code that is bound at runtime. This results in a separation of the API from the configuration data. In the framework 100, a provider manager (see, 206 in FIG. 2) determines the correct API configuration provider 108 to use at runtime, if more than one is provided within the framework 100. Further, the configuration provider 108 can be overridden to allow for multiple data-sources to be used as configuration sources.

After the API configuration provider 108 retrieves the configuration information from the database 112, it provides the information to the manager factory 105, which then generates a class to that handles communications to and from the resource. Implementation packages are discovered using reflection and bound using the GUID of the type of API. The resulting class is then associated with a shortcut name, bound to the physical resource, and placed in the SmartCache 110 so that lookup, creation and binding steps may be skipped in subsequent calls. For example, the application code may use the shortcut name to refer to the class, which results in loose binding. The developer of the application code 114 need not be aware of any of above, rather the developer merely writes the application code 114 against the common API 102.

Thus, using the framework 100, the application code 114 is portable and can be moved from one framework to another so long each of the frameworks adhere to the common API interface 102. As such, application code 114 may be written once and then implemented on one or more cloud-based infrastructures, e.g., Azure 116 or AWS 118, and/or within the on premises data center 120.

Figure 2:
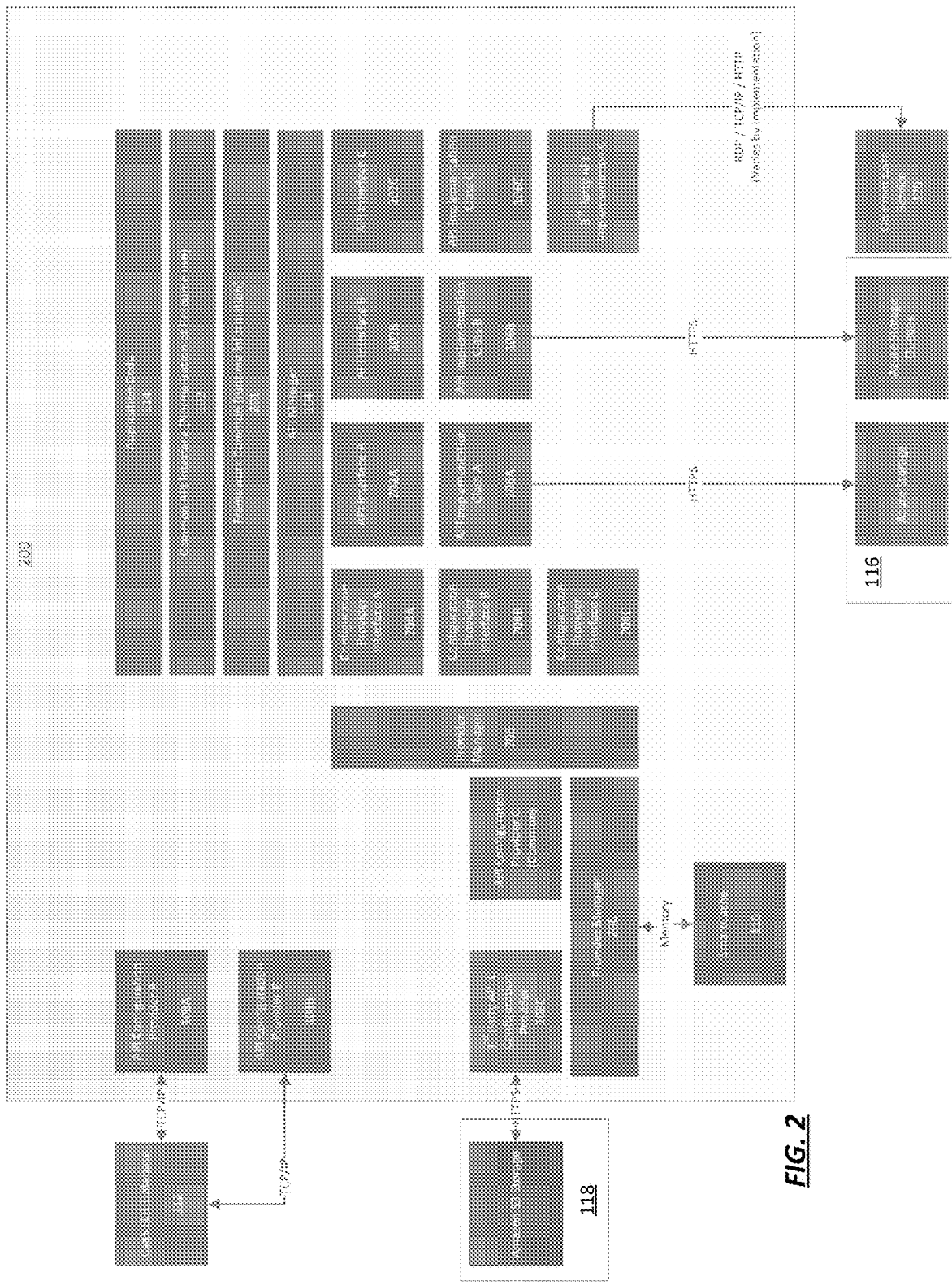
FIG. 2 illustrates a modified framework in accordance with the present disclosure.

With reference to FIG. 2, there is shown a modified framework 200 in accordance with the present disclosure. In particular, the framework 200 enhances the framework 100 and provides for independent modification of the configuration source and the target resource, and for multiple configuration providers 108A-108C. As in FIG. 1, the common API interface 102, a framework common runtime 201 and API manager 104 are a series of modules that each receive configuration data from an appropriate configuration provider 108A-108C and communicate to a specific external resource, e.g., Azure 116 (Azure storage, Azure storage queues), AWS 118 (Amazon S3 storage), the on-premises datacenter 120, etc. The API manager 104 determines which API implementation class 106A-106C to use at runtime.

In FIG. 2, API interfaces 202A-202C each have an associated configuration provider interface 204A-204C that communicates with the provider manager 206, which determines the appropriate implementation to use the runtime. The provider manager 206 decides how the configuration provider stores information and delivers is in a normalized matter. For example, the provider manager 206 may default to a SQL database (e.g., database 112), but any source of storage can be used. The provider manager 206 calls an appropriate API configuration provider 108A-108C, which are implemented for each type of resource. The called API configuration provider 108A-108C is acquires configuration data from the CaaS database 112 or other location, e.g., Amazon S3 Storage. As such, the storage resource may vary as well as the communication methods. Further, the resources may exist in any environment and are not limited to the environment in which the application is deployed. Third party code is introduced by adding packages to application. Managers auto-discover these pieces of code by the interface signature. No restrictions are placed on host, storage media or communication method used.

Figure 3:
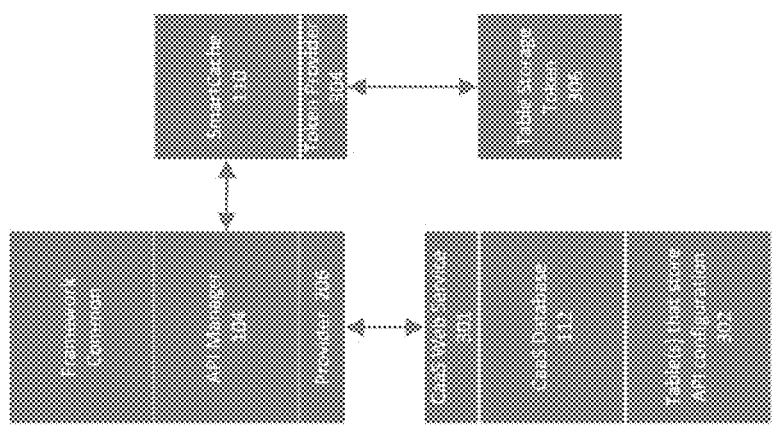
FIG. 3 illustrates additional details of the communication between components within the frameworks of the present disclosure.

FIG. 3 illustrates additional details of the communication between components within the frameworks 100 and 200 of FIGS. 1 and 2. In particular, a token provider 304 manages a table storage token 306 that is a shared token. The token 306 is used like shared private key within the frameworks and identifies the service environment that the code is running in. The provider 206 may pass the token 306 to a CaaS Web Service 301 that accesses tables 302 within the CaaS database 112 that store API configuration data. As such, the tokens 306 map clients to database connections.

Figure 4:
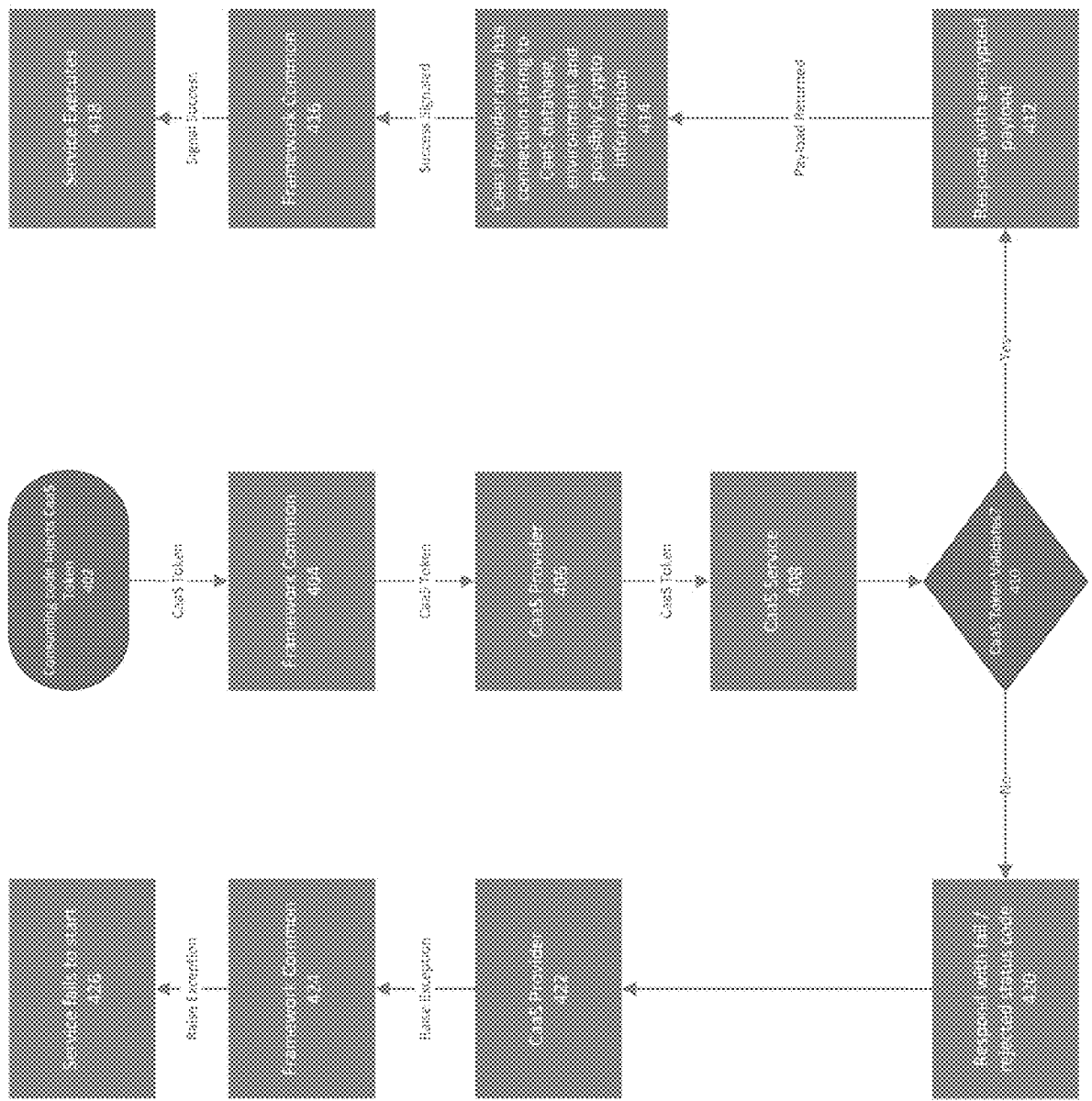
FIG. 4 illustrates an example workflow within the frameworks of the present disclosure.

With reference to FIG. 4, there is illustrated a CaaS workflow 400. When initializing, the application code 102 injects a CaaS Token 306 (step 402) which is passed to the common API interface 102 (step 404), the CaaS Provider (step 406) and the CaaS Web Service 301 (step 408) to acquire configuration data from the database 112 (as shown in FIG. 3). Note, the injection at 402 may be skipped and the token 306 may be hard-wired into the package in certain situations. At 410, it is determined if the provider 206 has validated the token and received its payload. The provider 206 may have a pre-determined list of URLs and uses them in order of listing until a good connection is established with a configuration source (e.g., database 112) or until the list is exhausted. The CaaS Web Service accepts the token and checks against a configuration initialization table. If so, then at 412, the API manager 104 performs a lookup and caching of different config data. The lookup may be performed using a singleton class that provides several binding mechanisms. The first is a provider binder which determines which code provides the configuration information. After that runs, there is another runtime process determines the code that runs the different API. API references may be made using "lazy" initialization. That is, if the class is available, but never used in a piece of code, it is never created. This allows for APIs to run much faster. As a result, an encrypted payload is returned, that initializes the CaaS provider 108. For example, the payload maybe encrypted JSON text.

Figure 5:
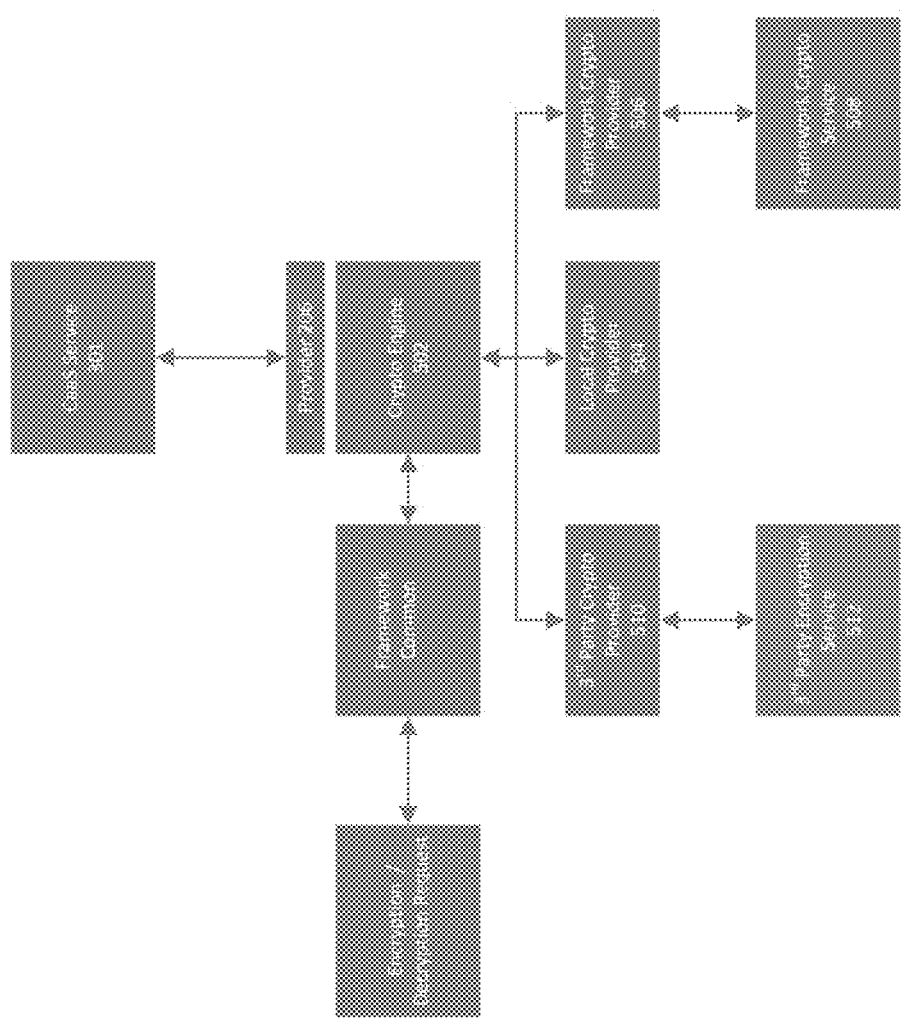
FIG. 5 illustrates details of the cryptographic features of the frameworks of the present disclosure.

FIG. 5 illustrates details of the cryptographic features executed by cryptographic engine 502 at 412. Cryptography within the frameworks is provided as an API. As shown, three methodologies may be implemented; however, the present disclosure is not limited to only three methods. A first method is performing all cryptographic operations locally (504). In this mode the cryptographic keys, salts and code run locally. The cryptographic engine 502 does not need to use any outside code to perform operations in a service. A second mode uses a gateway service 506. In the mode, operations are executed in one place, via a proxy service 508. All cryptographic information is maintained within the cryptograph engine 504 and is not shared. A third mode uses a third-party service 512 that performs cryptographic operations. In this mode, the third-party service 512 uses a plugin that follows a predetermined (e.g., ICryptoEngine) pattern utilized by, e.g., a cryptographic provider 510.

At 414, the CaaS provider unpacks the encrypted payload using a shared private key, which may be hard-wired and obfuscated in a local C # package. If keys and salts are transmitted, they are encrypted using two additional shared private keys and injected into the encryption engine. At 416, the CaaS provider now has its environment and primary/configuration database connection strings available to it. At this point, the framework common libraries have enough information to connect to the config database and invoke APIs to the correct resources. At 418, the service associated with the application code 114 executes.

Returning to 410, if the provider list of URLs is exhausted without connecting to a configuration source, it is determined that there is a failure at 420 and a failure code is provided to the CaaS provider at 422. An exception is raised by the API manager 104 at 424 and the service fails to start (at 426).

Figure 6:
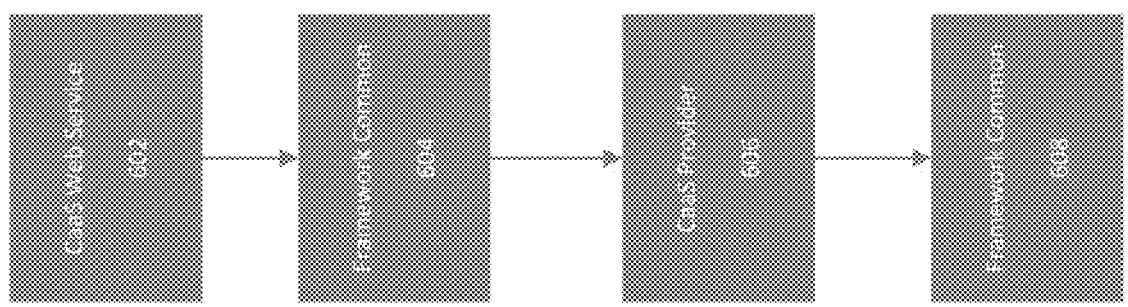
FIG. 6 illustrates an example CaaS bootstrap, administrative and/or web service configuration process.

FIG. 6 illustrates an example CaaS bootstrap process. In the framework 100, the CaaS web service 301 does not have a web service to call. This means the connection, cryptographic information, and environment information are hard-coded into the provider. At 602, the web service starts up, which initializes the common API interface 102 within the framework common (at 604) and the provider (at 606). However, web service does not inject a CaaS Token. Instead, the provider has a connection string, cryptographic information and environment hard-coded internally. The encryption engine 502 is injected with keys and salts. At 602, the common API interface 102 executes normally.

The operational flow of FIG. 6 may also be used as part of an administrative process. The system administrative boot process is executed when a CaaS Web Service does not yet exist or is unavailable and the administrator needs to access resources. In this mode, the provider has access to multiple environments and possibly many database resources. It also has the cryptographic resources embedded (keys and salts).

Thus, FIGS. 1-6 describe implementation details of the present disclosure to provide frameworks in which application code may be written to a standard set of APIs such that the application may be quickly developed and deployed on one or more cloud-based or on-premises datacenter environments.

Example Scenarios

Below are example scenarios that provide details as to how configuration services and packages work together to deploy to different PaaS/Custom environments. In each example, the API Provider talks to a configuration database and the specific API manager defines a common API surface area in a common interface. Individual implementations of the API implement the interface. Once this is mapped, the application developer then writes code to a single interface, regardless of how to the underlying resource is implemented. The idea is that mobility of enterprise code is paramount, as the key to our technology.

Scenario—Single PaaS Deployment

In this scenario, the system is operating in a single PaaS environment. This means all resources are hosted on a single vendor's data center. This can be on-premises or off-premises. Initially, the CaaS Web Service and Database are installed in the PaaS Environment. The common API interface 102 and Provider packages are then added to the project. If necessary, extension packages are registered to support non-Azure PaaS environments. For example, an AWS extension package (e.g., AzStudioAWSCommon) would be added to support AWS. The programmer then develops against the common API 102 provided by the appropriate API managers.

Scenario—on Premises Deployment with Planned Move to PaaS

In this scenario, the customer wants to future-proof their application. They plan to use a third-party PaaS environment sometime in the future, but they do not know which third-party PaaS they will eventually select. In this scenario, the on-premises APIs are used, but the abstraction of code will protect the applications from having to be rewritten later when new APIs are used. Here, the CaaS web service and databases can be deployed on any public-facing web server or service. Next, the common API interface 102 and Provider packages added to project. The Provider package points to CaaS Web Service. Additional packages which handle communication to on-premises resources are added to project. The common API interface 102 is initialized and the extension packages are detected and scanned. Then, using reflection, these extensions are registered with various managers. The programmer writes code to the common API 102. The various managers invoke either the Azure libraries or custom packages to communicate with various services. Later, when the application is moved to the third-party PaaS solution, routing information is changed. The managers will therefore use a different API to access the third-party PaaS resources. In some instances, the application will have new packages added so that it can communication to the target PaaS environment, however, the core application will not be changed.

Figure 7:
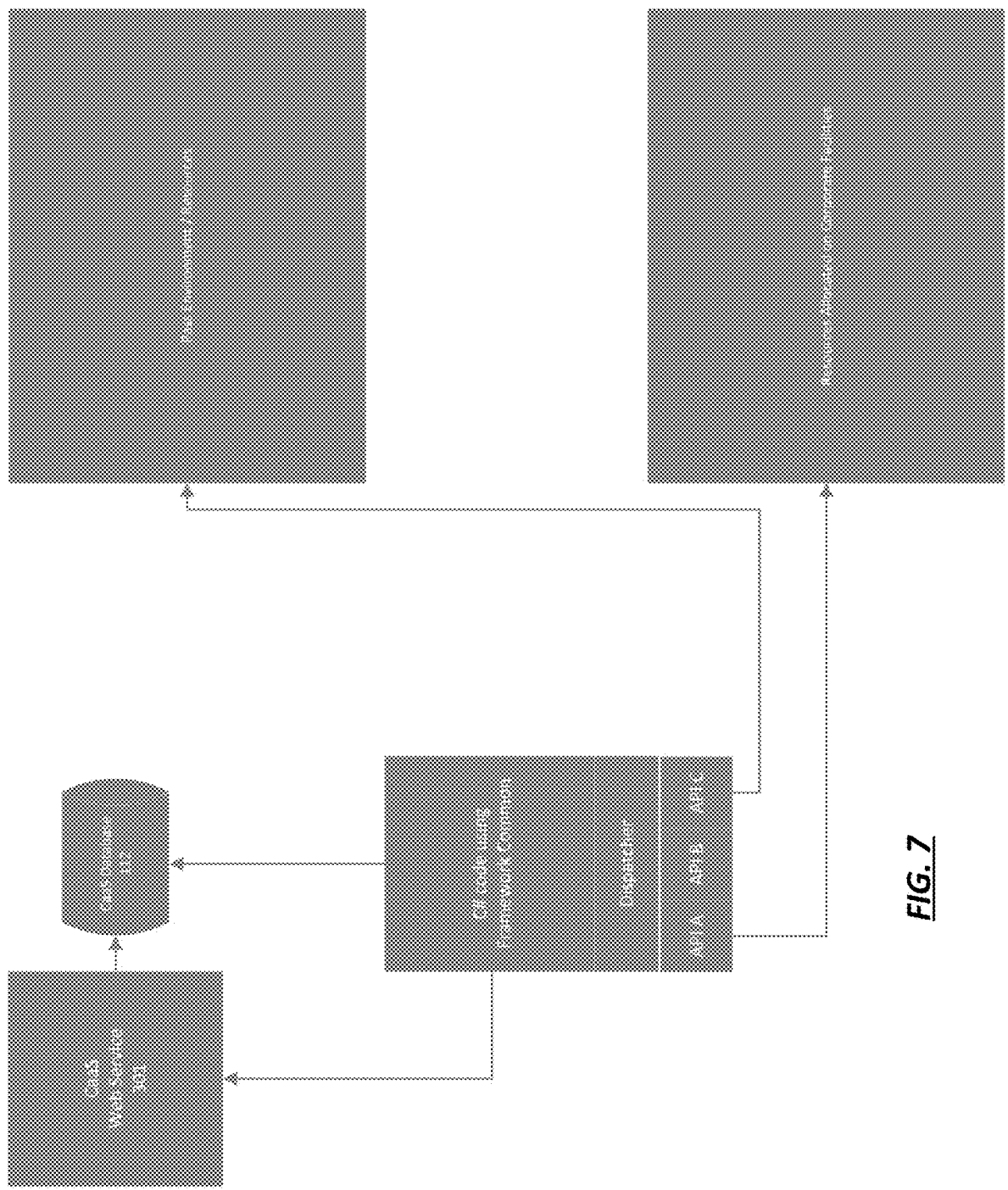
FIG. 7 illustrates an example hybrid development environment.

Scenario—Hybrid Deployment (FIG. 7)

With reference to FIG. 7, the CaaS web service and databases may be deployed on any public-facing web server or service. Next, the common API interface 102 and Provider packages added to project. The Provider package points to CaaS Web Service Additional packages which handle communications to on-premises resources are added to project. Common API interface 102 is initialized and the extension packages are detected and scanned. Then, using reflection, these extensions are registered with various managers. The Programmer writes code to the common API 102. The various managers invoke either the Azure libraries or custom packages to communicate with various services.

Figure 8:
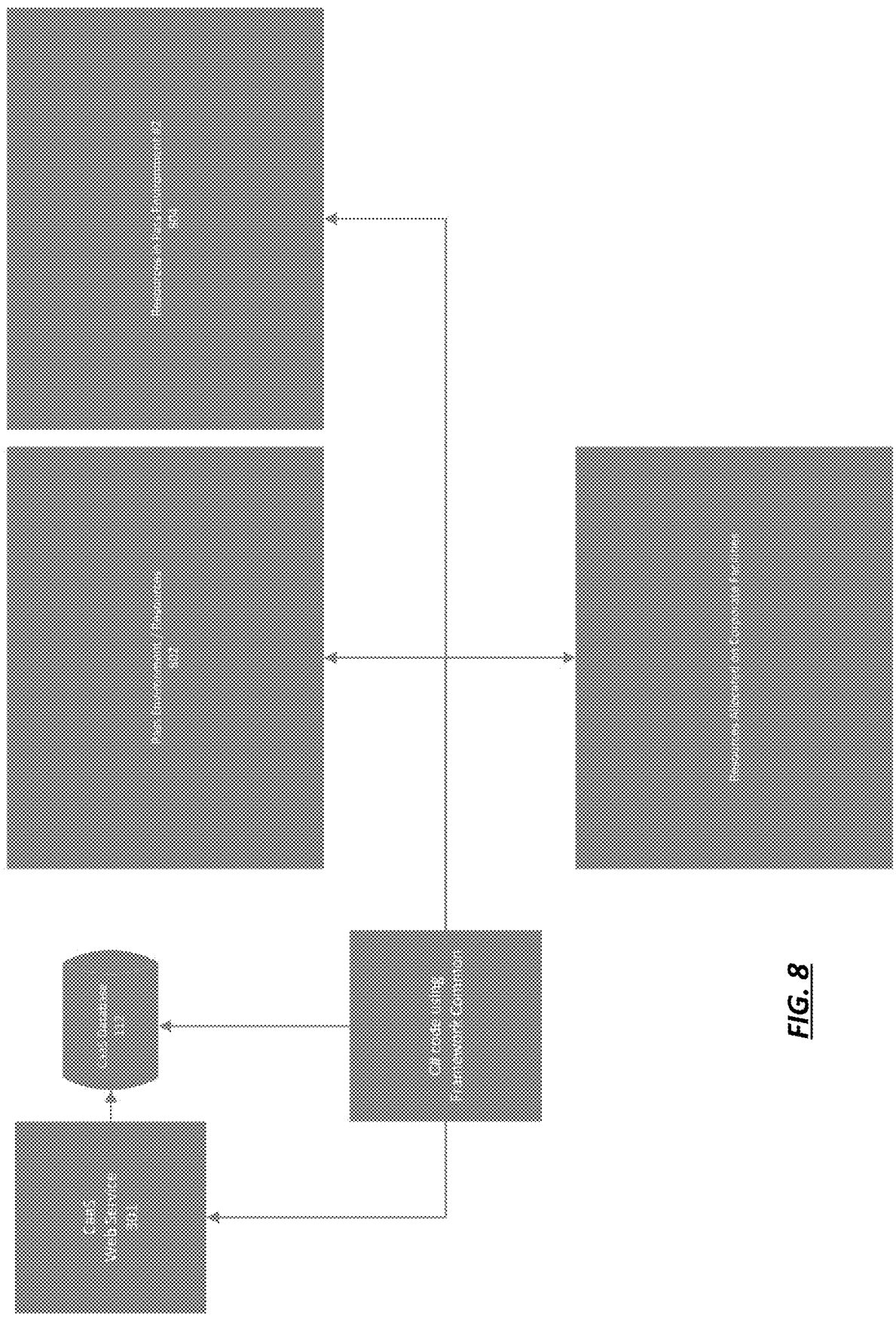
FIG. 8 illustrates an example multi-PaaS deployment environment.

Scenario—Multi-PaaS Deployment (FIG. 8).

With reference to FIG. 8, the CaaS web service and databases can be deployed on any public-facing web server or service. Next, the common API interface 102 and Provider packages added to project. The provider package points to CaaS web service, which can be hosted in any of the PaaS offerings (e.g., 802 or 804). Additional packages which handle communication to different resources are added to project. In some cases, multiple API extensions for the same resource type may be provided, allowing for quick changing of resources. The common API interface 102 is initialized and the extension packages are detected and scanned. Then, using reflection, these extensions are registered with various managers.

Example of Application-Level Code

Below is an example of application level code, and in particular, an IQueue interface which is used by transaction queues. IQueue is what the programmer is coding against, not a specific implementation of a queue. A shortcut name is passed it to IQueue, as the environment the code is deployed to will already be determined by API manager 104. The GetQueue command hides all of the complexity. Based on the type of queue that is bound to this shortcut in the configuration services the underlying IQueue implementation will be quite different.

IQueue queue=Az.QueueManager.GetQueue("demo");
// The most basic of operations, as any object can be enqueued.
queue.Enqueue(new object( ));
// objects are dequeued into a self-contained cache, which is then manipulated
queue.Dequeue (5):
// Queue items are cached locally and then deleted in a batch operation.
queue.CacheItems[ ].MarkedForDelete=true;
queue. DeleteMarked ( );

Example Queue Provider

The provider hands off data and hides the complexity of the details from API. Within the framework, both the API used and the abstraction of the source of data are flexible. "IAzQueueLookupProvider" matches, no matter what is used for configuration. As such, the storage of the configuration information and the actual implementation of the API are completely flexible allowing the programmer to focus on the business level code (application code 114).

```
public class AzQueueLookupProvider : IAzQueueLookupProvider
{
    private object _getQueueLock = new object( );
    public bool Default { get { return true; } }
    public Guid AzId { get { return Guid.Parse("87b6b9ec-8dd7-4515-b49d-39f192791ba3");
}}
    public bool IsCommonInterface { get { return true; } }
    public QueueShortcutItem GetQueue(string queueShortcutName)
    {
      lock (_getQueueLock)
      {
        QueueShortcutItem result = null;
        using (DataClassesAzStudioDataContext dc = new)
DataClassesAzStudioDataContext (ConnectionContextTypes.Config))
        {
            Az.Log.Warn(String.Format("Queue Cache Miss: {0} for environment: {1}",
queueShortcutName, Az.License.CurrentEnvironment.EnvironmentId));
            az_azstudioCustom_selectQueueShortcutByNameResult row =
```

```
dc.az_azstudioCustom_selectQueueShortcutByName(QueueShortcutName,
Az.License.CurrentEnvironment.EnvironmentId).FirstOrDefault( );
        if (row != null)
        {
            result = new QueueShortcutItem( )
            {
                ShortcutName = queueShortcutName,
                StorageAccountTypeId = row.storageAccountTypeId,
                StorageContainerTypeId = row.storageContainerTypeId
            };
        }
    }
    return result;
    }
  }
}
```

Consuming the provider may be as follows:

```
private QueueShortcutItem AcquireQueueShortCutItem(object args)
{
    return Az.Providers.QueueLookupProvider.GetQueue((string)args);
}
```

The provider and the API to be used is determined automatically at run time and are bound together by interfaces.

Configuration Providers

A configuration provider links a data source to the system and provides configuration data from that source. Herein, the default source may be the CaaS database 112. However, the provider can be overridden to allow for multiple datasources to be used as configuration sources. Below is an example API—Transaction Queues.

```
namespace AzStudio Common.Providers
{
    public interface IAzQueueLookupProvider: IAzBaseProvider
    {
        QueueShortcutItem GetQueue(string queueShortcutName);
    }
}
```

Any provider that that wants to provide transaction queue configuration information to the manager must implement IAzQueueLookupProvider contract. It must also set the DEFAULT property to FALSE. When the provider manager creates the transactional queue provider it scans memory, looking for code that implements the IAzQueueLookupProvider interface.

QueueLookupProvider=
DetermineProperProvider<IAzQueueLookupProvider>
("IAzQueueLookupProvider");

The provider has two states, Default=true or Default=false. When the DetermineProperProvider scans code (using a process called "Reflection") it can result in four possible states:

No code implements a provider—Error.
There is only one provider—Use this one.
There are two providers—Use the one marked Default=false.
There are more than two providers for the particular interface—Error.

Once the provider is created it is considered the data source for configuration. Connectivity to the data source is variant, for example, SQL data sources may be supported. SQL data is read using standard SQL stored procedures and O-Data layers. In this case, LINQ to SQL is used.

Abstraction

Abstraction within the frameworks allows for flexible and portable configuration data sources. For example, some configuration data can be stored in an Amazon S3 storage container while other configuration data can be stored in the CaaS database. Still other configuration data can be shipped in the traditional manner, using CONFIG files. The benefit of this is several-fold and provides for support of multiple deployment destinations at once. For example, the configuration of current code can be maintained. Projects do not immediately have to refactor the data source of configuration. In addition, the configuration source can be moved when the customer feels comfortable. Projects can "upgrade" to a more central data source without disturbing the underlying application code. Further, the configuration data is normalized. As long as the application code follows the configuration contract (i.e., the interface), the code will never have to be changed even if the format of the configuration data changes dramatically.

Code for Determining Provider

The first call is to DetermineProperProvider. This call then invokes the reflection engine so scan and load the best piece of code or throw an exception. If the engine throws an exception the default (NULL in most cases) value is returned and the error is logged.

```
private T DetermineProperProvider<I> (string providerInterfaceName)
{
    T result = default(T);
    try
    {
        result =
(T)Az.ReflectionEngine.LoadBestDynamic(providerInterfaceName);
    }
    catch(Exception ex)
    {
        Az.Log.Error(ex);
    }
    return result;
}
```

The reflection engine code is as follows. Note that it scans all code the project for the particular interface and the determines the best candidate to return based on the rules mentioned earlier. Note the IBaseSubstitutionClass, which any class that can be overridden by this engine must implement.

```
public object LoadBestDynamic(string interfaceName)
{
   object result = default(object);
   List<Assembly> assemblies =
AppDomain.CurrentDomain.GetAssemblies( ).ToList<Assembly>( );
   List<object> candidates = new List<object>( );
   foreach (Assembly a in assemblies)
   {
      try
      {
         Type[ ] tps = a.GetTypes( );
         foreach (Type t in tps)
         {
            if ((t.GetInterface(interfaceName) != null) &&
(!t.IsAbstract) && (t.GetInterface("IBaseSubstitutionClass") != null))
            {
               candidates.Add(Activator.CreateInstance(t));
            }
         }
      }
      catch (Exception ex)
      {
         Console.WriteLine(a.FullName);
         Console.WriteLine(ex.Message);
      }
   }
   switch(candidates.Count)
   {
      case 1:
         result = candidates[0];
         break;
      case 2:
         BaseSubstitutionClass testObject;
         foreach(object obj in candidates)
         {
            testObject = (baseSubstitutionClass)obj;
            if (!testObject.Default)
            {
               result = obj;
               break.;
            }
         }
         break.;
      default:
         throw new Exception(String.Format("You have more than one
override for the assembly {0}. Check your plugins and packages for the duplicate items.",
interfaceName));
   }
   return result;
}
```

API Managers and Interfaces

An API that is supported by the frameworks is done so via amManager. They are defined by their interface. That is, what an API can do is reflected by the API interface, not by the underlying third-party PaaS offering. Thus, as described above, programmers code against the common API interface 102, not the specific PaaS environment they are deploying to. If the PaaS environment changes, the specific PaaS implementation of a manger is simply replaced, not the application code 114.

Example of a IQueueManager

```
// *************************************************************
using System;
namespace AzStudio Common
{
   /// <summary>
   /// Interface IQueueManager
   /// </summary>
   public interface IQueueManager: IBaseSubstitutionClass
   {
      /// <summary>
      /// Maximum retries queue operations are allowed. Defaults to zero (throws
exception immediately)
      /// </summary>
      /// value>The maximum queue retries.</value>
      in MaxQueueRetries { get; set; }
      /// <summary>
      /// Gets the queue or creates and gets one. Note the arguments are the same
as the storage account
```

-continued

```
        /// classes, that's because the storage accounts are directly linked to
queues.
        /// </summary>
        /// <param name="environmentId">The environment identifier.</param>
        /// <param name="storageAccountTypeId">The storage account type
identifier.</param>
        /// <param name="storageContainerTypeId">The storage container type
identifier.</param>
        /// <param name="federationKey">The federation key.</param>
        /// <returns>IQueue.</returns>
        IQueue GetQueue(Guid environmentId, Guid storageAccountTypeId, Guid
storageContainerTypeId, int federationKey = 0);
        /// <summary>
        /// Gets the queue. This is the preferred queue reference method. Set up
the reference in the azStudio config database
        /// from there you can reference complex queue storage arrangements via a
shortcut name.
        /// The current environment id is used with this call.
        /// </summary>
        /// <param name="queueShortcutName">Name of the queue shortcut.</param>
        /// <returns>IQueue.</returns>
        IQueue GetQueue(string queueShortcutName);
        /// <summary>
        /// Enqueues the specified item to the specified queue
        /// <param name="item">The item.</param>
        /// <param name="queueShortcutName">Name of the queue shortcut.</param>
        /// <param name="federationKey">The federation key.</param>
        void Enqueue(IStatItem item, string queueShortcutName, int federationKey =
0);
        /// <summary>
        /// Enqueues the specified item.
        /// </summary>
        /// <param name="item">The item.</param>
        /// <param name="queueShortcutName">Name of the queue shortcut.</param>
        /// param name="federationKey">The federation key.</param>
        void Enqueue(object item, string queueShortcutName, int federationKey = 0);
        /// <summary>
        /// Enqueues the standard web call stat.
        /// </summary>
        /// param name="ticksStart">The ticks start.</param>
        /// param name="webServiceName">Name of the web service.</param>
        void EnqueueStandardWebCallStat(long ticksStart, string webServiceName);
        /// </summary>
        /// Returns the number of messages in the queue or −1. if there is an error
        /// </summary>
        /// <param name="queueShortcutName">Name of the queue shortcut.</param>
        /// returns>System.Int32.</returns>
        int MessageCount(string queueShortcutName);
    }
}
```

Example of IQueue

In the following example, the IQueue (e.g., a representation of a physical transaction PaaS resource) is defined. If, for example, an AWS simple queue where to be substituted a new class, that physically knows how to talk to the specific API would have to be written. The AWS and Azure code both follow the same interface, which means the underlying details of PaaS communication are left up to the specific implementation of IQueue.

```
// ***********************************************************
using System;
using System.Collections.Generic;
using Microsoft.WindowsAzure.Storage.Queue;
namespace AzStudio Common
{
    /// <summary>
    /// Interface IQueue
    /// </summary>
    public interface IQueue: IBaseSubstitutionClass
    {
        /// <summary>
        /// Used to find the Big Item container reference.
```

-continued

```
If null or empty or does not exist then BigItem won't work.
        /// <summary>
        /// <valve>The name of the big item short cut.</value>
        string BigItemShortCutName { get; set; }
        /// <summary>
        /// Queue's short cut name. If you manually create the queue
(rather than using a shortcut, please populate this)
        /// </summary>
        /// <value>The name of the queue short cut.</value>
        string QueueShortCutName { get; set; }
        /// <summary>
        /// Gets or sets the environment identifier, since we might have
queues with the same shortcut name in cache for different edvironments
        /// <summary>
        /// <value>The environment identifier.</value>
        Guid EnvironmentId { get; set; }
        /// <summary>
        /// When data (after encryption) exceeds this threashold the queue
will automatically use
        /// BigItem logic.
        /// Note: If you don't have the proper storage container shortcut
then Bigitem won't be used.
        /// Storage container shortcut must be names
BI_[QueueShortcutName]_[FederationIdExcept0]
```

-continued

```
/// </summary>
/// <value>The big item threshold.</value>
int BigItemThreshold { get; set; }
/// <summary>
/// Hook up to this event to encrypt data just before it goes into the Azure queue
/// </summary>
event EncryptionDelegate OnEncrypt;
/// <summary>
/// Hook up to this event to decrypt data just after it is fetched from the queue
/// </summary>
event EncryptionDelegate OnDecrypt;
/// <summary>
/// Gets the current message count from the queue reference
/// if possible. Otherwise it will return 0
/// </summary>
/// <returns>Current Message Count in the queues</returns>
int CurrentMessageCount( );
/// <summary>
/// Gets the dequeue cache which is filled by the Dequeue method
/// </summary>
/// <value>The dequeue cache.</value>
List<IQueueWrapper> DequeueCache { get; }
/// <summary>
/// Gets the unprocessed cache items. This is the preferred method to
/// pull items from the DequeueCache. This prevents you from double-processing
/// items that have their markedfordelete flag set, which means that sometime in the past
/// the item was successfull processed but the queue was not coiled to remove it.
/// </summary>
/// <returns>List<IQueueWrapper></returns>
List<IQueueWrapper> GetUnprocessedCacheItems( );
/// <summary>
/// Gets or sets the client. Will use the storage account item to physically connect to the storage container
/// </summary>
/// <value>The client.</value>
CloudQueueCaient Client { get; set; }
/// <summary>
/// Gets or sets the queue connection. This is the reader/writer to the queue storage container
/// </summary>
/// <value>The queue connection.</value>
CloudQueue QueueConnection { get; set; }
/// <summary>
/// Gets or sets the storage account item. Basically, this is the queue item we're writing to
/// </summary>
/// <value>The storage account item.</value>
IStorageAccountConnectionItem StorageAccountItem { get; set; }
/// <summary>
/// Enqueues the specified value, with the ability to retry if the queue is busy
/// </summary>
/// <param name="value">The value.</param>
/ <param name="retryCount">The retry count.</param>
void Enqueue(object value);
/// <summary>
/// Allows you to inject prefab JSON for types that might not be available even at runtime.
/// </summary>
/// <param name="typeName">Name of the type.</param>
/// <param name="json">The json.</param>
/// <param name="retryCount">The retry count.</param>
void EnqueueString(string typeName, string json);
/// <summary>
/// Dequeues up to count messages from the Azure Queue. This just places this in the local cache,
/// in order to get the messages out to your code you need to use QueryCache
/// </summary>
/// <param name="count">The count.</param>
// <param name="retryCount">The retry count.</param>
void Dequeue(int count = 20);
/// </summary>
/// Deletes the marked items from the queue
void DeleteMarked( );
/// </summary>
/// Queries the cache for any items of the specifc type . . . this will only
/// return objects of a specific type on the queue. So if your queue
/// has multiple types of messages and order between them is not
/// important then this is your go-to method.
/// </summary>
/// <typeparam name="T"></typeparam>
/// <param name="typeName">Name of the type.</param>
/// <returns>List<T>.</returns>
List<T>QueryCache<T>(string typeName);
/// <summary>
/// Dequeues count objects using the PeekMessages method instead of readmessages
/// </summary>
/// <param name-"count">The count.</param>
void DequeuePeek(int count = 20);
  }
}
```

Az Class and Manager Loading

The Az Class implements the references to all API's currently supported by the frameworks. As the range of API offerings expand, the list expands.

Below is an example API—transactional queues:

```
public static IQueueManager QueueManager
   {
      get
      {
        if (_queueManager != null) { return _queueManager; }
        _queueManager = GetSubstituteManager<IQueueManager>("IQueueManager");
        if (_queueManager == default(IQueueManager))
        {
          _queueManager = new QueueManager( );
        }
        return _queueManager;
      }
   }
private static T GetSubstituteManager<T>(string interfaceId)
{
   T result = default(T);
   bool foundSubstitute = false;
   foreach (object item in _substituteObjects)
   {
     if (item.GetType( ).GetInterface(interfaceId) != null)
     {
       result = (T)item;
       foundSubstitute = true;
```

```
      break;
    }
  }
}
if (!foundSubstitute)
{
   object obj= (object)Az.ReflectionEngine.LoadBestDynamic(interfaceId);
   if (obj != null)
   {
      result = (T)obj;
   }
}
return result;
}
```

GetSubstitutionManager allows for injection of substitution in two manners, one is passive inclusion in the code and other is direct injection of a specific object. In either case, the correct implementation of the manger is returned. The application developer then makes call to the normalized name. In this case, Az.QueueManger and works with the individual queues via Az.QueueManager.Queue[ ]. The implementation of a queue is totally dependent on the underlying queue PaaS offering, which may differ significantly based on vendor.

Example Business Logic (Application Code 114)

As noted above, business logic is written against the common API interface 102. If the application code 114 follows this rule, the application is guaranteed to be portable for similar resources. In this example below, the transactional queue is referenced. The application programmer does not need to know where the physical queue is implemented, or the underlaying API used to communicate to the resource. A shortcut name is used to reference the configuration/resource. This fully abstracts the configuration and implementation details from the application code. As such, code examples are completely portable if the configuration or implementation elements change. For example, moving from an on-premises datacenter 120 to Azure 116 can be performed occur without modifying business logic.

Acquire a Queue Reference
IQueue queue=Az.QueueManager.GetQueue("shortcutName");
Enqueue an Item
queue. ("this is a queue message");
Deque an Item
queue.Dequeue(1);
Examine Queue Contents
IQueueWrapper wrapper=queue.queueCache[0];
string msg=
Utilities.DeserializeObject<string>(wrapper.DataAsBase64);

Example User Interfaces

Figure 9:
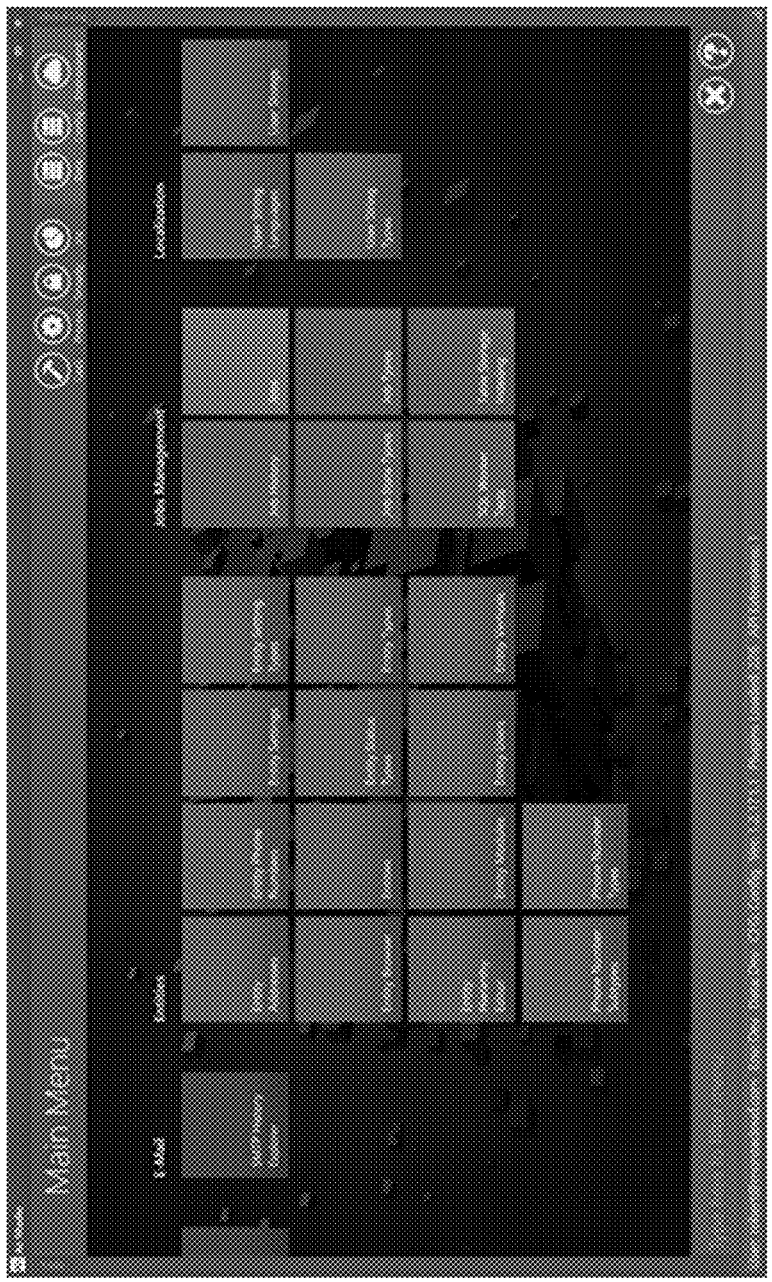
FIGS. 9-15 illustrate example user interfaces associated with frameworks of the present disclosure.

FIGS. 9-15 illustrate example user interfaces associated with the frameworks of the present disclosure. FIG. 9 illustrates an initial screen that shows a host application and a set of plugins. The plugins follow a pre-defined interface that allows them to self-organize. Plugins that follow this interface allows a plugin to gain access to data about the environment, data connections and security with no additional coding. By selecting the CONFIG button, a database server can be selected to act as the configuration source. All plugins automatically use this configuration source for configuration data. The ENVIRONMENT button allows the application and plugins to change which logical environment they are operating in. That is, environment CONTEXT can be changed on the fly. Plugins are automatically aware of which environment they are point to.

Figure 10:
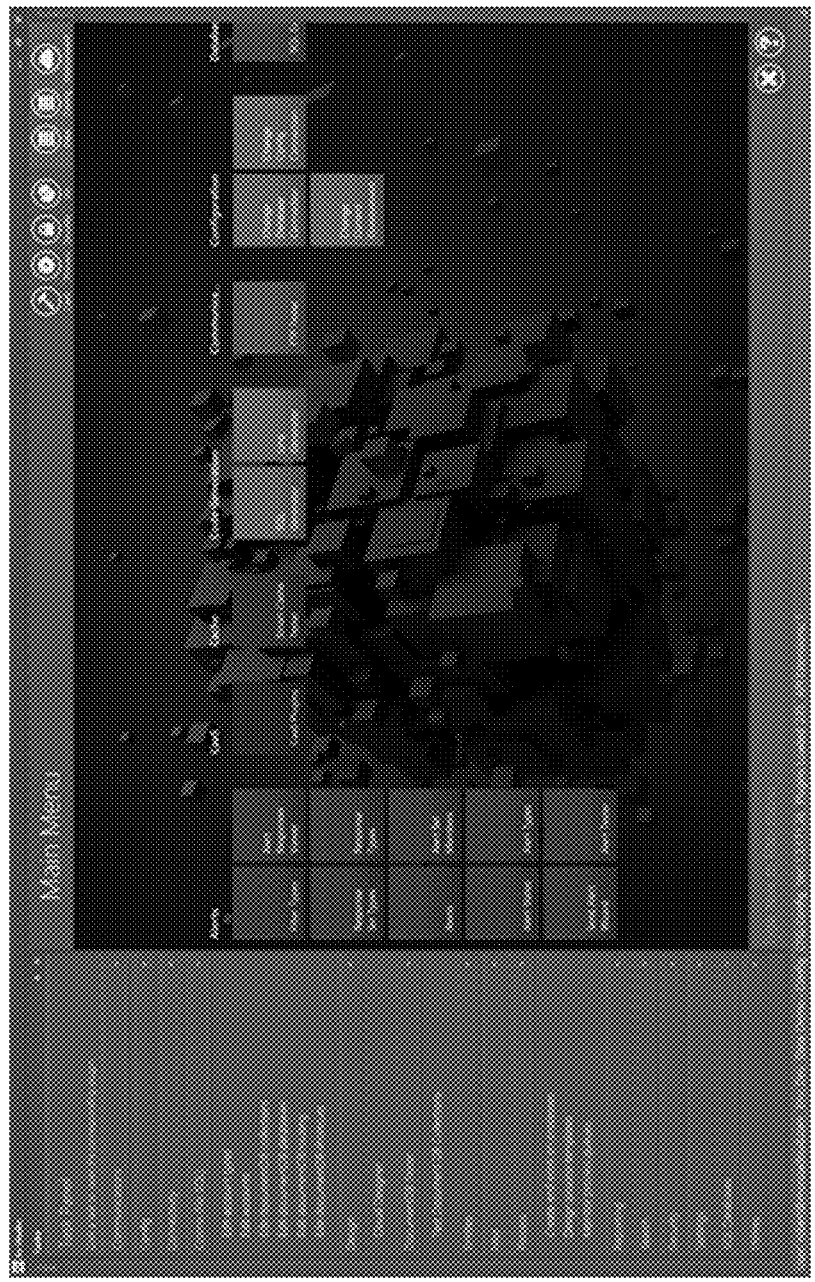

FIG. 10 illustrates a tasks panel where plugins can expose shortcuts to themselves using more descriptive text. A plugin may register as many task panel entries as they wish, with minimal additional coding. The user can find any plugin or task via a search bar. All elements on all sub-menus are registered automatically in the unified search engine. Users can search on terms in the titles, descriptions, or on special key-words registered by the plugin at runtime. This search functionality is real-time and programmers do not need additional coding to access. Also, security is pre-applied to search terms. Users who do not have access to the plugin to not see it on the search results.

Figure 11:
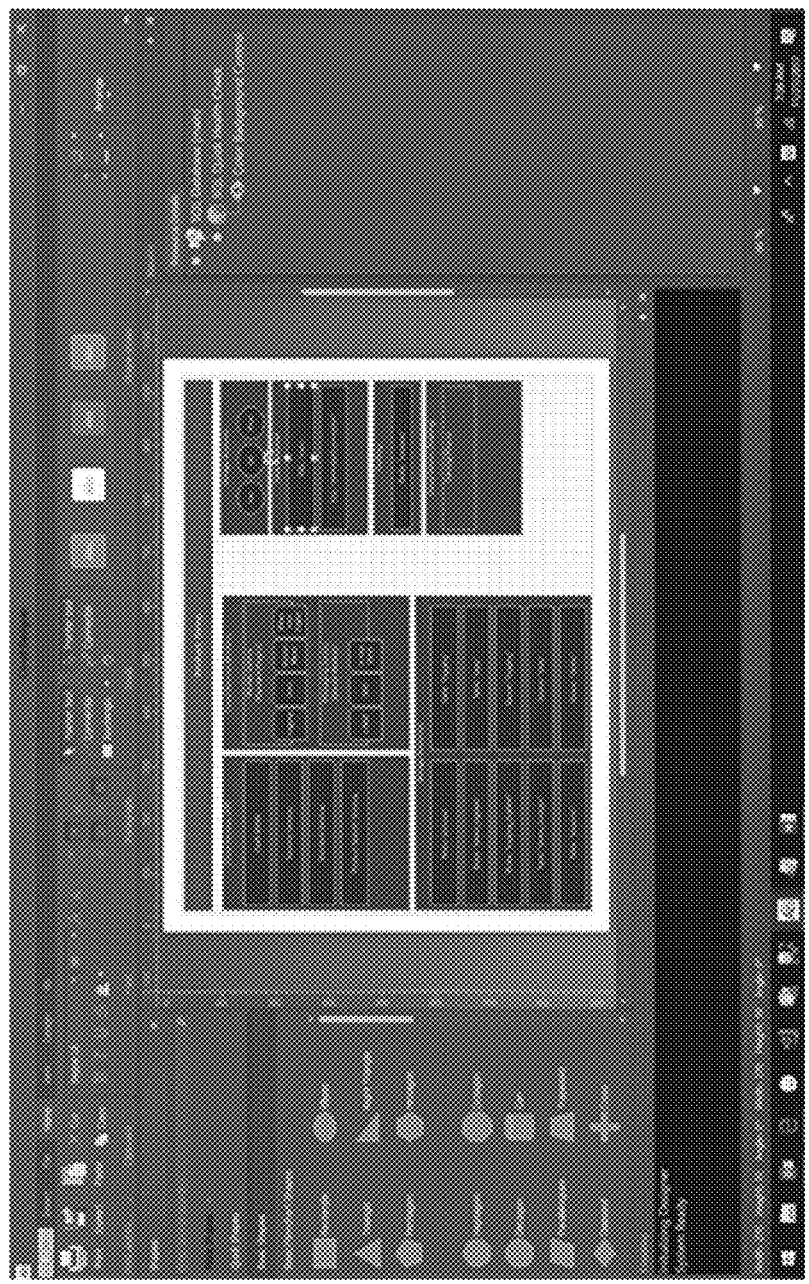

FIG. 11 illustrates a visualizer that allows a developer to draw-out a PaaS application and connect to physical assets via a visualizer plug-in system. This allows for functionality to be mapped to any supported environment and for this drawing to automatically re-map to a different environment on the fly. Visualizer plugins allow for any kind of functionality, from deployment of resources to checking and monitoring health of system or visually reporting that the configuration is correct in the target environment. A health check of the different linked resources can be performed.

Figure 12:
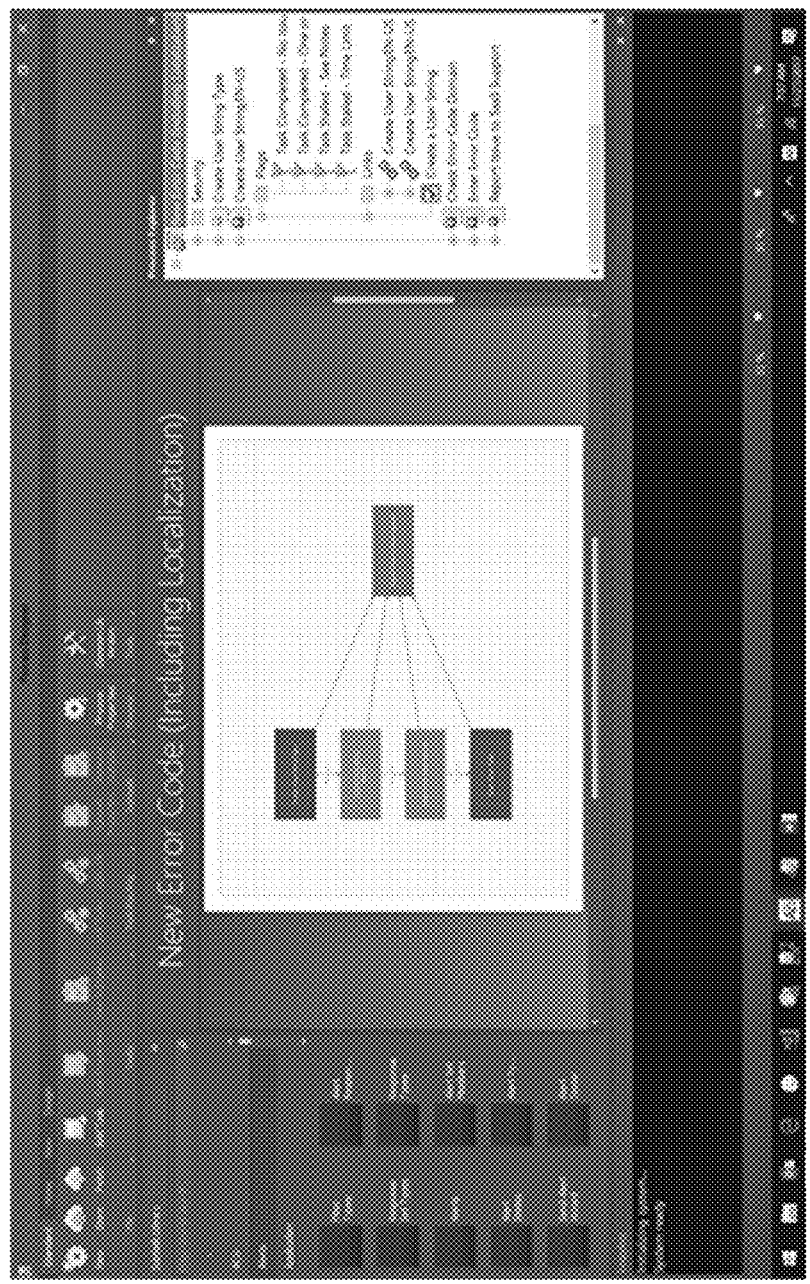
Figure 13:
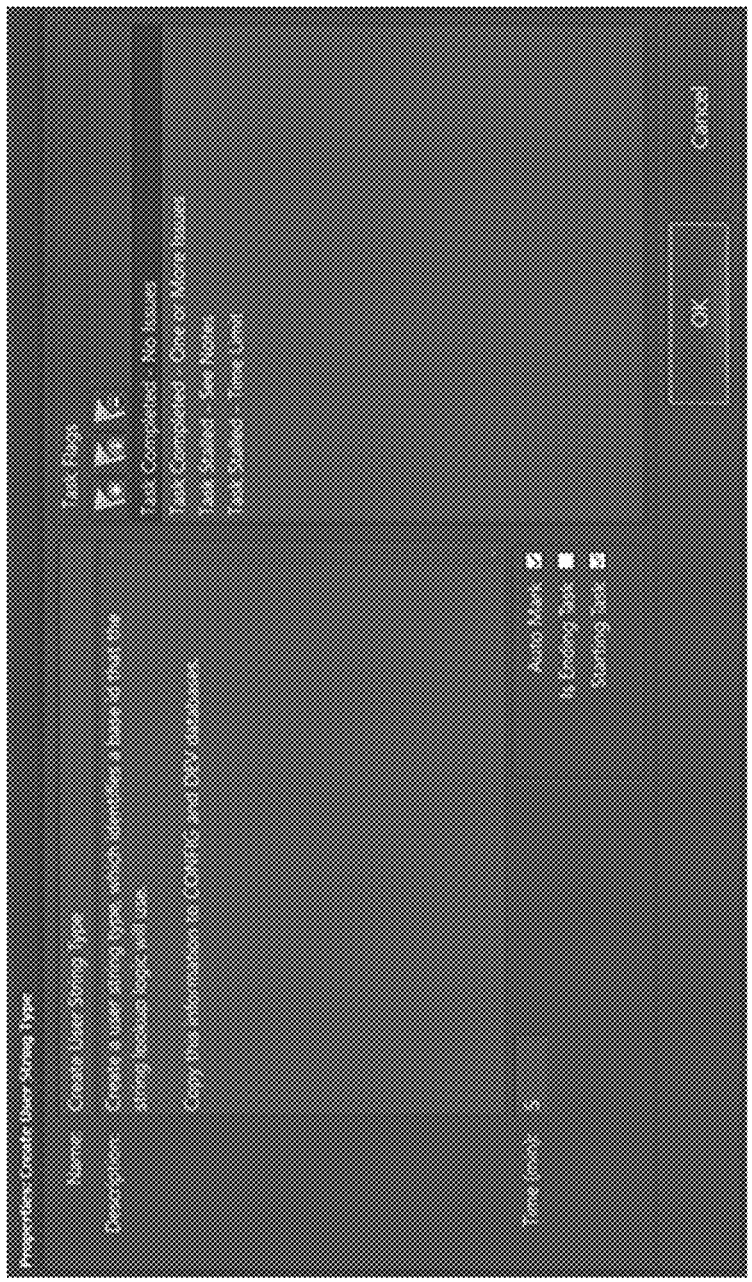
Figure 14:
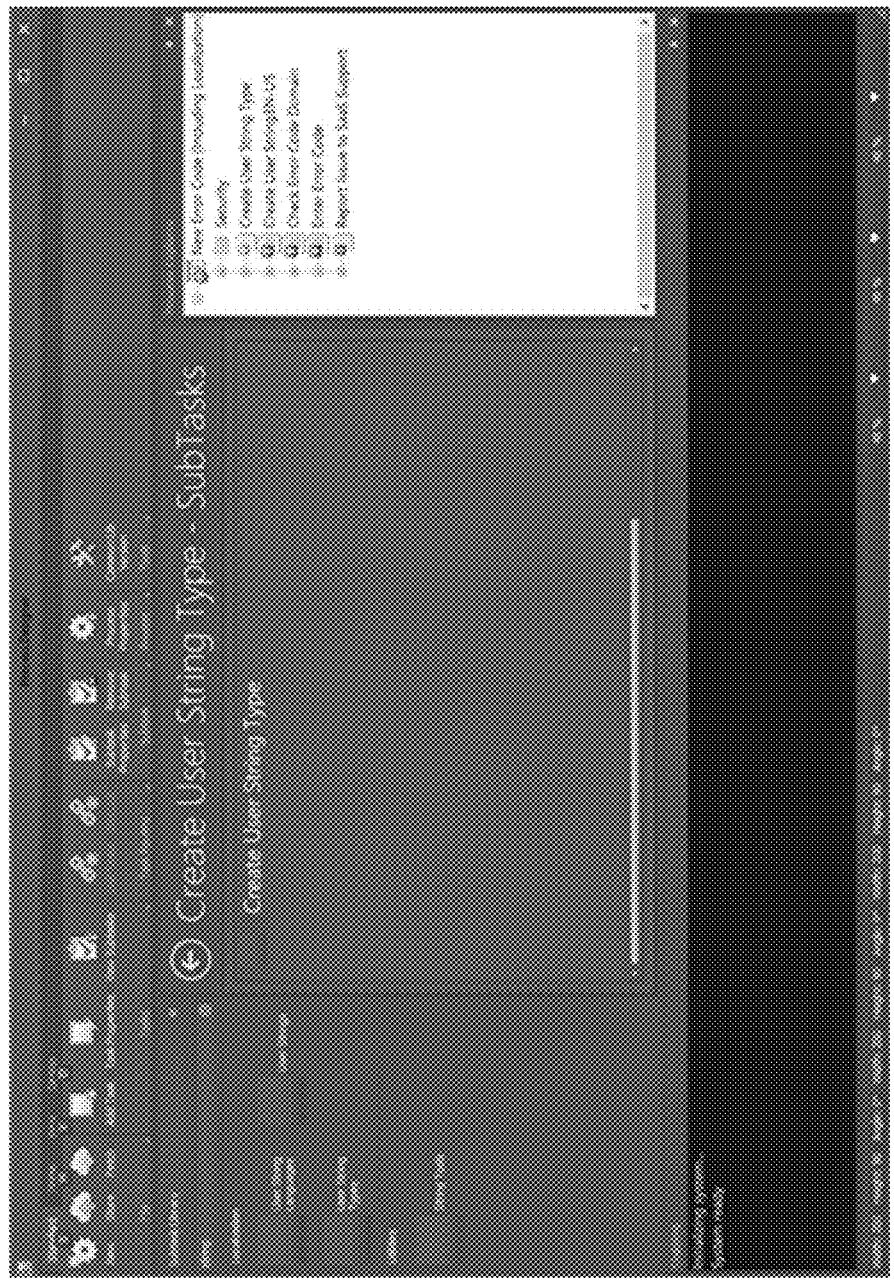

FIG. 12 illustrates a process creation user interface in which plugins can be arranged into workflow templates. These workflow templates, also known as process templates, are drawn. This creates a visual design. Plugins are dropped into each element of the drawing (known as tasks), creating subtasks. Plugins can participate in this engine with no additional coding. It is built into the underlying architecture. FIG. 13 shows an example task properties user interface. FIG. 14 shows a subtask properties user interface.

Figure 15:
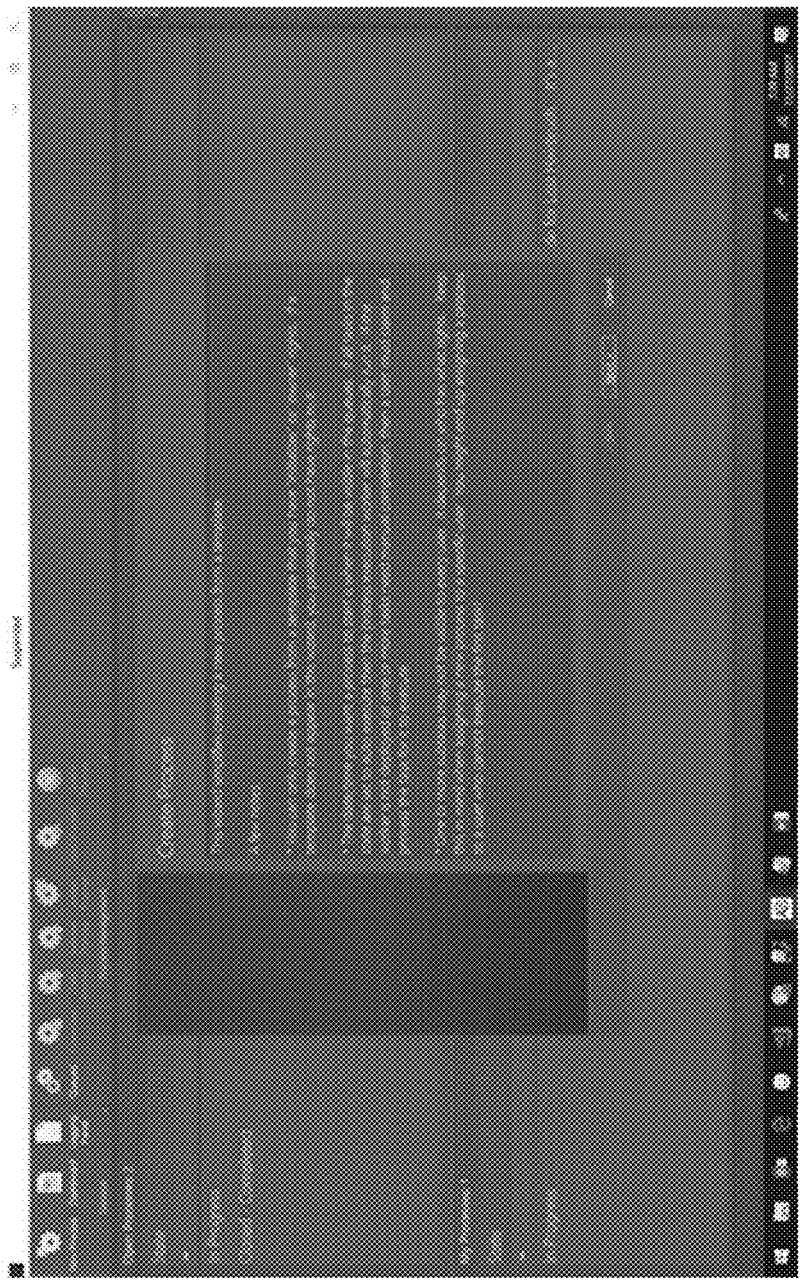

FIG. 15 show a process creation user interface wherein a wizard walks the developer through the step to create a process. Process execution and monitoring may also be performed through other user interfaces.

Example Computing Environment

Numerous other general purpose or special purpose computing system environments or configurations may be used to implement the features of the present disclosure. Examples of computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 16:
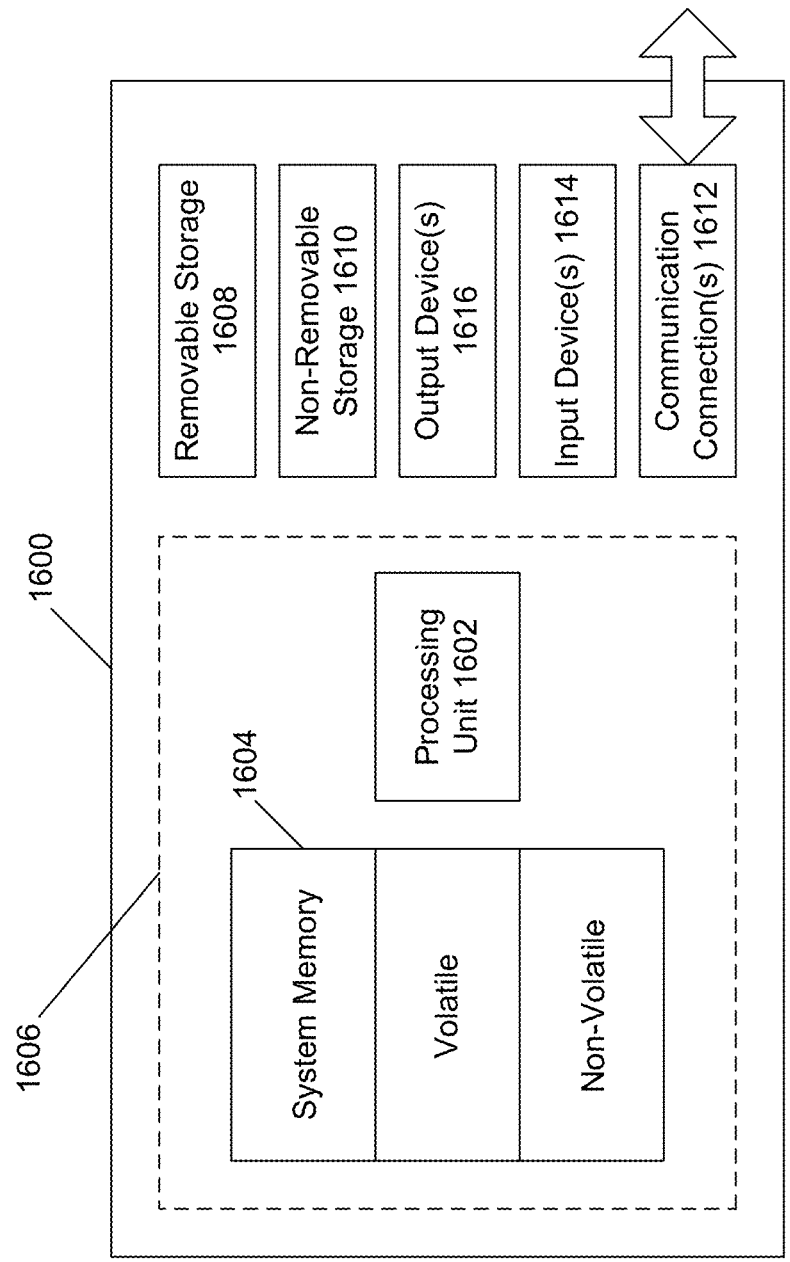
FIG. 16 illustrates an example computing environment in which aspects of the disclosure may be implemented.

With reference to FIG. 16, an exemplary system for implementing aspects described herein includes a computing device, such as computing device 1600. In its most basic configuration, computing device 1600 typically includes at least one processing unit 1602 and system memory 1604. Depending on the exact configuration and type of computing device, system memory 1604 may be volatile (such as random access memory (RAM)), non-volatile (such as read-only memory (ROM), flash memory, etc.), or some combination of the two. This most basic configuration is illustrated in FIG. 16 by dashed line 1606.

Computing device 1600 may have additional features and/or functionality. For example, computing device 1600 may include additional storage (removable and/or non-removable) including, but not limited to, magnetic or optical disks or tape. Such additional storage is illustrated in FIG. 16 by removable storage 1608 and non-removable storage 1610.

Computing device 1600 typically includes a variety of computer-readable media. Computer-readable media can be any available media that can be accessed by computing device 1600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 1604, removable storage 1608, and non-removable storage 1610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1600. Any such computer storage media may be part of computing device 1600.

Computing device 1600 may also contain communication connection(s) 1612 that allow the computing device 1600 to communicate with other devices. Communication connection(s) 1612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 1600 may also have input device(s) 1614 such as a keyboard, mouse, pen, voice input device, touch input device, etc. Output device(s) 1616 such as a display, speakers, printer, etc., may also be included. All these devices are well known in the art and need not be discussed at length here.

Computing device 1600 may be one of a plurality of computing devices 1600 inter-connected by a network. As may be appreciated, the network may be any appropriate network, each computing device 1600 may be connected thereto by way of communication connection(s) 1612 in any appropriate manner, and each computing device 1600 may communicate with one or more of the other computing devices 1600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for service development and deployment in a Platform as a Service (PaaS) environment, comprising:
executing a framework that:
receives, at a common API interface, requests from application code for predetermined functionalities provided by the service framework;
uses an API manager to connect each of the requests to an associated resource in the PaaS environment;
provides plural API configuration providers;
executes a provider manager that determines an appropriate one of the API configuration providers to be used for each type of resource; and
uses the appropriate one of the API configuration providers to retrieve configuration data from a linked configuration data source to provide the configuration information to the API manager that then binds an implementation class that handles communications to and from the resource and the application code; and
executing a service in accordance with the application code that is bound at runtime by the framework,
wherein the service is executed on-premises, as a combination of on-premises and PaaS components or in an Infrastructure as a Service (IaaS) environment.

2. The method of claim 1, wherein the application code communicates to C # interfaces that each provide a functionality.

3. The method of claim 2, wherein the C # interfaces are defined in a generic manner such that they can be applied to any PaaS environment.

4. The method of claim 1, wherein each type of resource has its own interface and classes self-register the type of resource to which they will bind.

5. The method of claim 1, wherein a unique GUID or identity column (INT) identifies each type of resource, and wherein the unique GUID or identity column (INT) is stored in the linked configuration data source.

6. The method of claim 1, further comprising:
associating the implementation class with a shortcut name;
binding the implementation class to the associated resource, and
placing the shortcut name in a cache.

7. The method of claim 1, wherein the application code is written once and adapted to be implemented on disparate PaaS infrastructures that each execute the framework.

8. The method of claim 7, wherein the PaaS infrastructures comprise a cloud-based service or an on premises data center.

9. The method of claim 1, further comprising using a token within the framework to identify the linked configuration data source that stores API configuration data.

10. The method of claim 1, wherein access to the API interface and the configuration data is normalized.

11. A method for executing a service in a Platform as a Service (PaaS) environment, comprising:
executing a framework having an API manager, common libraries, a configuration provider and a configuration data source, the framework further defining a common API interface;
receiving a token from application code associated with the service at the API interface;
acquiring, by the configuration provider, configuration data as an encrypted payload from a configuration data source;
providing a cryptographic engine that is called using an API;
decrypting the encrypted payload using a shared private key to expose unencrypted configuration data; and
providing the unencrypted configuration data to configuration provider;
caching the unencrypted configuration data;
executing the common libraries in accordance with the configuration information to invoke APIs that connect to resources requested by the application; and
executing the service in accordance with the application that is bound at runtime by the framework,
wherein the service is executed on-premises, as a combination of on-premises and PaaS components or in an Infrastructure as a Service (IaaS) environment.

12. The method of claim 11, further comprising:
acquiring configuration data in accordance with a predetermined list of URLs associated with plural configuration data sources.

13. A non-transitory computer readable medium having stored thereon computer-executable instructions that when executed by a computing device, cause the computing device to perform a method, comprising:
executing a framework that:
receives, at a common API interface, requests from application code for predetermined functionalities provided by the service framework;
uses an API manager that binds an implementation class to connect each of the requests to an associated resource in the PaaS environment
provides plural API configuration providers;
executes a provider manager that determines an appropriate one of the API configuration providers to be used for each type of resource; and
uses the appropriate one of the API configuration providers to retrieve configuration data from a linked configuration data source to provide the configuration information to the API manager that then binds an implementation class that handles communications to and from the resource and the application code; and
executing a service in accordance with the application code that is bound at runtime by the framework,
wherein the service is executed on-premises, as a combination of on-premises and PaaS components or in an Infrastructure as a Service (IaaS) environment.

14. The computer-readable medium of claim 13, further comprising computer-executable instructions for using a unique GUID that identifies each type of resource, and wherein the unique GUID is stored in the linked configuration data source.

15. The computer-readable medium of claim 13, further comprising computer-executable instructions for:
associating the implementation class with a shortcut name;
binding the implementation class to the associated resource, and
placing the shortcut name in a cache.

16. The computer-readable medium of claim 13, further comprising computer-executable instructions for using a token within the framework to identify the linked configuration data source that stores API configuration data.

17. The computer-readable medium of claim 13, wherein access to the API interface and the configuration data is normalized.

* * * * *